United States Patent
Wetmore et al.

[15] 3,662,094
[45] May 9, 1972

[54] HEAT RECOVERABLE INSULATING COVER FOR ELECTRICAL TERMINAL, AND METHOD OF MANUFACTURE

[72] Inventors: Judson Douglas Wetmore, San Mateo; Donald R. Allan, Menlo Park, both of Calif.

[73] Assignee: Raychem Corporation, Menlo Park, Calif.

[22] Filed: July 6, 1970

[21] Appl. No.: 52,523

[52] U.S. Cl. .......................174/138 F, 156/85, 174/DIG. 8, 264/230, 339/276 F
[51] Int. Cl. .......................................................H01b 17/00
[58] Field of Search ....................174/138 F, DIG. 8; 156/84, 156/85, 86; 264/230, 291, 342 R, DIG. 66, DIG. 71; 339/116 R, 116 C, 213 R, 213 T, 275 T, 276 F, 276 T

[56] References Cited

UNITED STATES PATENTS

| | | | |
|---|---|---|---|
| 3,455,336 | 7/1969 | Ellis | 174/DIG. 8 UX |
| 1,998,356 | 4/1935 | Brown | 264/230 X |
| 2,740,101 | 3/1956 | Betts | 174/138 F UX |
| 2,885,105 | 5/1959 | Heyl et al. | 264/230 X |

FOREIGN PATENTS OR APPLICATIONS

| | | | |
|---|---|---|---|
| 1,098,304 | 1/1968 | Great Britain | 174/DIG. 8 |
| 1,149,611 | 4/1969 | Great Britain | 174/DIG. 8 |

Primary Examiner—Laramie E. Askin
Attorney—Lyon & Lyon

[57] ABSTRACT

Heat-shrinkable plastic material is molded, expanded, laterally distorted and cooled to provide an insulating cover for a flag-type electrical terminal assembly having right-angle components. The cover when positioned to enclose such terminal assembly and when heated changes its shape to envelop the terminal assembly in close-fitting relationship.

6 Claims, 11 Drawing Figures

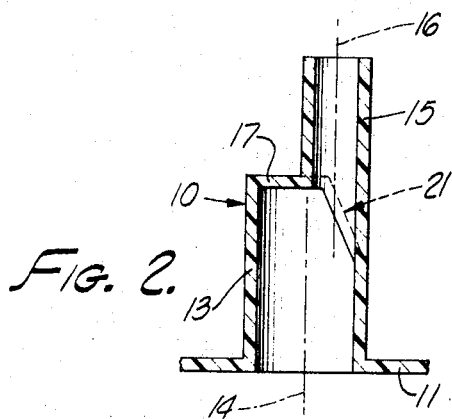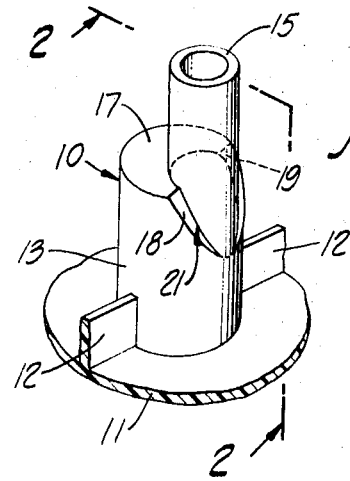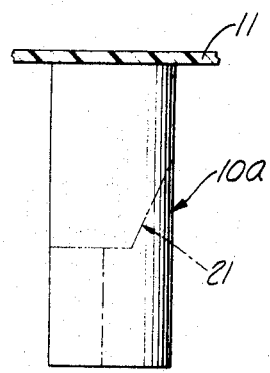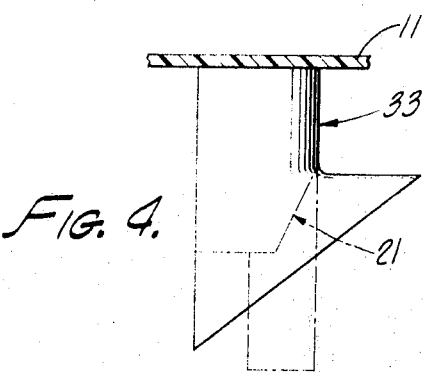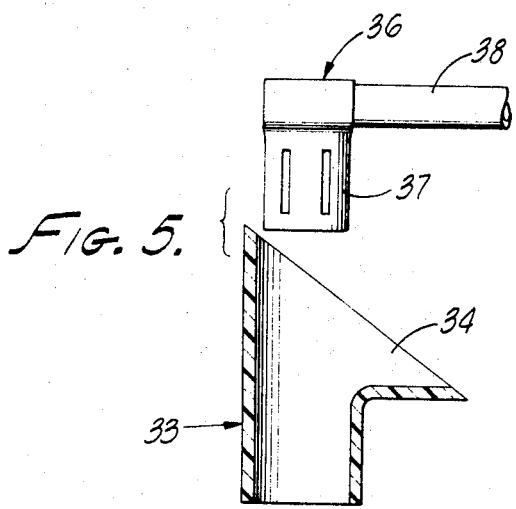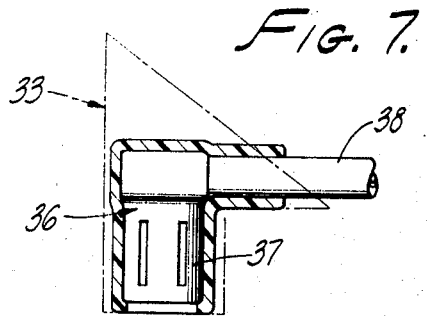

PATENTED MAY 9 1972 3,662,094

INVENTORS.
JUDSON DOUGLAS WETMORE
DONALD R. ALLAN
BY
Lyon & Lyon
ATTORNEYS

HEAT RECOVERABLE INSULATING COVER FOR ELECTRICAL TERMINAL, AND METHOD OF MANUFACTURE

This invention relates to heat-shrinkable or heat recoverable articles and more particularly relates to such articles adapted for use as an insulating cover for an electrical terminal assembly having angular parts. Examples of material useful in forming such dimensionally heat unstable recoverable articles may be found in Currie U.S. Pat. No. 2,027,962 and Cook et al. U.S. Pat. No. 3,086,242, disclosures of which are incorporated herein by reference. Polymeric materials which have been cross linked by chemical means or by irradiation, for example, with high energy electrons or nuclear radiation, such as those disclosed in the Cook et al. patent, are preferred for use in the present invention. Non-crystalline polymeric materials exhibiting the property of plastic or elastic memory, such as polyurethane, ionomers, etc., could also be used in practicing the present invention.

This invention will be described in connection with an insulating cover for an electrical terminal assembly having a metal tab projecting laterally from a wire-receiving socket, but it is to be understood that this is by way of illustration only, and not by way of limitation.

Electrical terminals of the "quick-connect" or "tab" type are commonly used in such industries as automobiles, appliances, small tools and machine tools, and business machines and equipment. Insulating covers for such electrical terminals are commonly installed over the terminal parts after they have been connected. Thus, insulating covers for such terminals commonly take the form of pre-molded semi-rigid "snap-on" devices, hard or soft vinyl "crimp-ons" or "weld-ons," heat-shrinkable tubing or dilated polyvinylchloride. The insulating cover may also be molded directly in place by injection. Most of these insulating covers require manual feeding of the terminated wire end.

An important aspect of the present invention relates to a method of insulating "quick-connect" or "tab" electrical terminals through the use of heat-shrinkable covers. Another aspect of this invention relates to the form of the heat-shrinkable cover itself and to the form of the blank for making it. An advantage of the insulating cover of this invention is that no special device or tool is needed to hold the cover in order that it be in proper position when fully recovered on the terminal, and no special fixture or cooling form is required in order to accomplish proper installation.

Briefly stated, the method of this invention comprises the steps of molding a blank of heat-shrinkable insulating material, the blank comprising a hollow body joined to an offset tube of smaller transverse dimension. The blank is then heated and the tube is mechanically expanded to approximately the same transverse size as the body. The blank may then be cooled so that it retains its expanded shape and may be subsequently reheated and the tube laterally deformed mechanically to form a laterally extending open pocket, and the blank is then cooled so that it retains its laterally deformed shape. The resulting cover may be applied directly to an electrical terminal assembly having a metal tab projecting laterally from a wire-receiving socket, and when subjected to heat, the cover envelops the terminal assembly in close fitting relationship.

In another aspect of this invention, there is provided a blank formed of heat-shrinkable insulating material, which blank comprises a hollow body integrally joined to an open ended tube of smaller transverse dimension, the body having an axis offset but parallel to the axis of the tube, so that portions of the outer surfaces of the body and tube are substantially flush. The body is provided with an end wall partially encircling the adjacent end of the tube, and the body has exposed curved edges defining an angled intersection adjacent flush portions of the body and tube and joining the end wall.

More especially, this invention provides a blank of such a material comprising a first tube having a circumferential wall, a partially closed end and an open end, a major portion of the partially closed end comprising a first wall perpendicular to the axis of the tube and a minor portion comprising a second bevel wall inclined to the axis, the second wall intersecting the circumferential wall between the open end and the plane of the first wall, and a second tube having a circumferential wall and open ends, and having an axis parallel to that of the first tube passing substantially through the mid-point of the intersection between the first and second walls and having a diameter smaller than that of the first tube and such that it shares a common tangent with the first tube, the second tube extending outwardly from the partially closed end of the first tube while one open end of the second tube is contiguous with the partially closed end of the first tube and forms the opening therein.

Other and more detailed objects and advantages will appear hereinafter.

In the drawings:

FIG. 1 is a perspective view of a blank formed of heat-shrinkable plastic material, in the as-molded unstressed condition.

FIG. 2 is a sectional view taken substantially on the lines 2—2 as shown in FIG. 1.

FIG. 3 is a side elevation of the blank after the expansion step, the blank being shown in inverted position.

FIG. 4 is a view similar to FIG. 3, showing the blank after the distortion step which converts it to the configuration ready for use.

FIG. 5 is a sectional side elevation of the insulating cover, in position to receive a flag-type electrical terminal assembly having a metal tab projecting laterally from a wire-receiving socket.

FIG. 6 is a bottom view of the cover shown in FIG. 5.

FIG. 7 is a sectional side elevation similar to FIG. 5, showing the final shape of the insulating cover after being subjected to heat to cause it to shrink about and to envelop the electrical terminal assembly.

Figure 8:
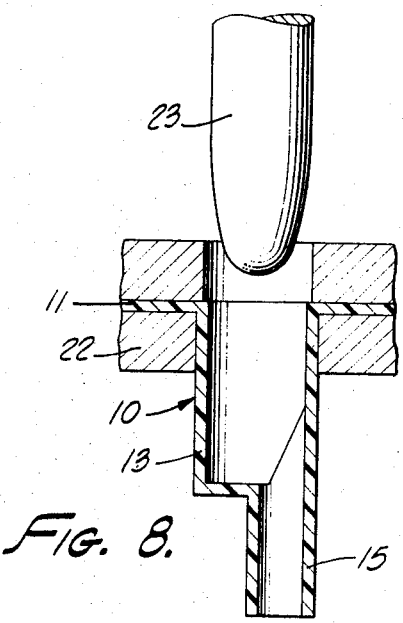
FIG. 8 is a sectional elevation showing apparatus for expanding the inverted plastic blank (of FIG. 2), the parts being shown prior to the expansion operation.

Referring to the drawings, the blank generally designated 10 and shown in FIGS. 1 and 2 is preferably molded as one of a long series of identical articles connected by a common web 11 and strip 12. Each of the blanks 10 is formed of heat-shrinkable insulating material and includes a hollow cylindrical body 13 having a central axis 14. The body 13 is integrally joined to an open-ended cylindrical tube 15 of smaller diameter having an axis 16. The axis 16 is laterally offset but parallel to the axis 14 so that portions of the outer surfaces of the body 13 and tube 15 are substantially flush. An end wall 17 on the body partially encircles the adjacent end of the tube 15, and this end wall 17 is joined by exposed curved edges 18 and 19 of tapering width which complete the encirclement of the tube 15 and which define a notch 21 adjacent the flush portions of the body and tube. FIGS. 1 and 2 show the blank 10 in its initial unstressed condition following molding.

Figure 9:
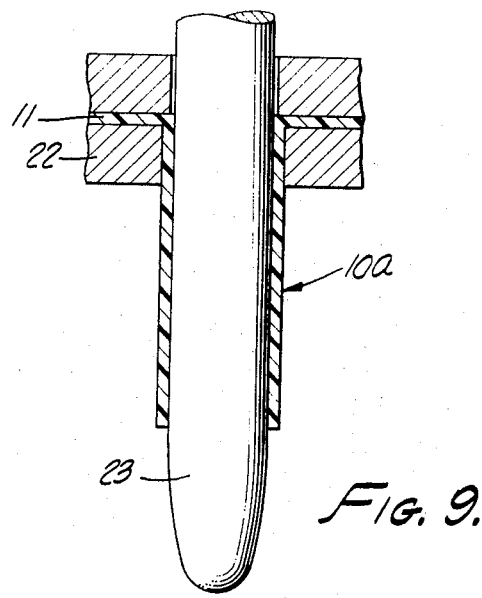
FIG. 9 is a view similar to FIG. 8, the parts being shown in position following the expansion operation.

The strip 12 is then removed and the blank 10 is inverted and clamped in a die 22 as shown in FIG. 8. The blank 10 is heated and a metal plunger 23 is moved through the die 22 and into the interior of the hollow body 13 and through the interior of the offset tube 15, to expand the tube to the position shown in FIG. 9. In this latter position, the tube 15 has been expanded to substantially the same diameter as the body 13. FIG. 3 shows the expanded blank 10a, with the previous unstressed shape as shown in phantom lines.

Figure 10:
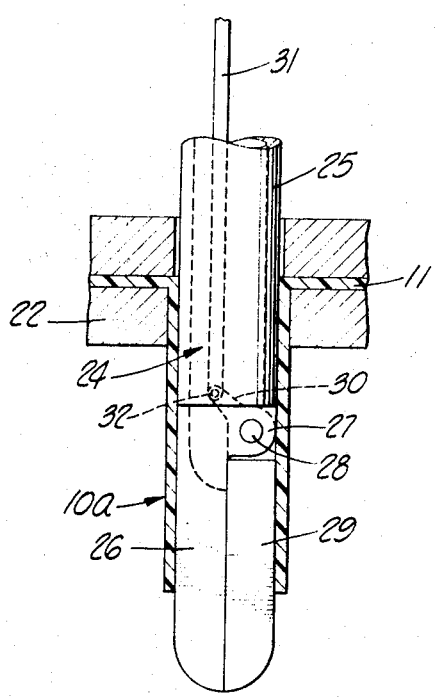
FIG. 10 is a sectional view showing apparatus for laterally distorting the expanded blank of FIG. 3, the parts being shown prior to the distortion operation.
Figure 11:
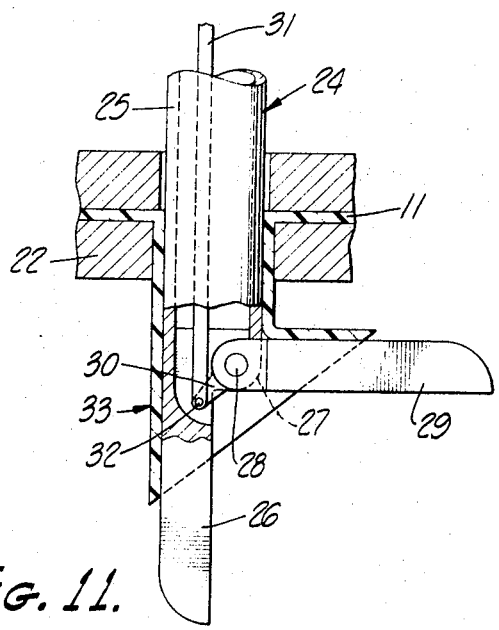
FIG. 11 is a view similar to FIG. 10, the parts being shown in position at conclusion of the lateral distortion operation.

The next step in the method is to deform a portion of the expanded blank 10a to produce the cover 33 shown in FIGS. 5 and 6. The expanded blank may be cooled while the plunger 23 is in the position shown in FIG. 9. The plunger 23 is withdrawn and a second plunger assembly 24 is inserted into the expanded blank 10a, as shown in FIG. 10. This plunger assembly 24 includes a hollow tubular section 25 having an integral projection 26 which extends through the lower end of the expanded blank. The extension 26 includes laterally spaced ears 27 carrying a pivot pin 28. A movable part 29 is mounted on the pin 28 and provided with a crank arm 30. An actuating rod 31 is pin-connected at 32 to the arm 30, so that downward movement of the rod 31 with respect to the plunger part 25 serves to swing the part 29 from the position shown in FIG. 10 to the position shown in FIG. 11. This movement of the part 29 occurs after the expanded blank has been reheated. After the lateral deformation has occurred, as shown in FIG. 11, the blank, now in the form of a cover 33, is cooled so that it retains its shape when the part 29 is swung back to the position shown in FIG. 10, and after the plunger assembly 24 is withdrawn. The web 11 is then removed and the cover taken from the die 22.

FIG. 4 shows the shape of the expanded and laterally deformed part, prior to removal of the web 11, and also shows the earlier shape of the as-molded blank in phantom lines. It will be noted that the lateral deformation occurs in the region of the notch 21.

The laterally expanded cover 33, as shown in FIGS. 5 and 6, has a side opening pocket 34 which permits easy assembly of the right-angle electrical terminal 36 with respect to the cover 33. This terminal assembly 36 is of conventional flag-type design, having a metal tab 37 projecting laterally from a wire-receiving socket 38. The installation of the cover 33 on the electrical terminal assembly 36 is accomplished through relative movement of the parts.

After the cover 33 has been brought into position to enclose the electrical terminal 36, heat is applied to the cover 33, and this causes it to shrink to the final position shown in FIG. 7, in which the cover envelops the electrical terminal 36 in close-fitting relationship.

It will be noted that in the process described above the molded blank is produced without the requirement of right-angle core pulls and, when applied to a right-angle terminal, assumes the dimensions of and the geometry of that part. Molds used for molding right-angle molded objects require intricate core-pulling mechanisms to remove transverse cores in a timed manner before removal of the straight cores. Such molds are expensive, require considerable time to build, operate at a much slower rate, and have to be much larger and contain less cavities for a given mold or press area. The cover 33 produced in accordance with the above method avoids these difficulties.

Another advantage of the insulating cover produced in accordance with this invention is that it provides a final insulating enclosure in which the wall thickness at various points is relatively uniform. Also, the insulating cover may be quickly applied and subsequently heat-shrunk independently of the mechanical portions of the device for connecting the electrical terminal with its mating part and without requiring any external appurtenance to hold either the wire or the terminal or the insulating cover in proper orientation.

Having fully described our invention, it is to be understood that we are not to be limited to the details herein set forth, but that our invention is of the full scope of the appended claims.

We claim:

1. A blank for producing an insulating cover adapted to envelop an electrical terminal assembly, said blank being formed of heat-shrinkable insulating material and comprising a hollow body integrally joined to an open-ended tube of smaller transverse dimension, the body having an axis offset but parallel to the axis of the tube so that portions of the outer surfaces of the body and the tube are substantially flush, the body having an end wall partially encircling the adjacent end of said tube, and the body having exposed edges defining a notch adjacent said flush portions of the body and tube, and joining said end wall.

2. A blank for producing an insulating cover to protect an electrical terminal assembly, said blank being formed of heat-shrinkable insulating material and comprising a hollow cylindrical body integrally joined to an open-ended cylindrical tube, the outer diameter of the body being greater than the outer diameter of the tube, the axis of the body being offset but parallel to the axis of the tube so that portions of the outer surfaces of the body and the tube are substantially flush, the body having an end wall partially encircling said tube, and the body having exposed curved edges defining a notch adjacent said flush portions of the body and tube, and joining said end wall.

3. The method of producing an insulating cover for an electrical terminal assembly having a metal tab projecting laterally from a wire-receiving socket, said method including the following steps: molding a blank of heat-shrinkable insulating material, said blank comprising a hollow body joined to an offset tube of smaller transverse dimension, heating the blank, expanding the tube to approximately the same transverse size as the body, deforming the expanded tube while heated to form a laterally extending open pocket, and cooling the blank.

4. The method of producing an insulating cover for an electrical terminal assembly having a metal tab projecting laterally from a wire-receiving socket, said method including the following steps: molding a blank of heat-shrinkable insulating material, said blank comprising a hollow body integrally joined to an open-ended tube of smaller transverse dimension, the body having an axis offset but parallel to the axis of the tube so that portions of the outer surfaces of the body and the tube are substantially flush, the body having an end wall partially encircling said tube and having exposed edges defining a notch adjacent said flush portions of the body and tube, heating the blank, expanding the tube to approximately the same transverse size as the body, deforming the expanded tube in the region of the notch while heated to form a laterally extending open pocket, and cooling the blank.

5. A pre-stressed insulating cover for a flag-type electrical terminal, the cover being formed of heat-shrinkable tubular plastic material having a configuration comprising walls forming an open ended tubular portion having a laterally extending lip at one side and an axially extending projection at the other side, said lip and projection defining an open pocket with an inclined entrance opening which cover, when positioned to enclose the flag-type electrical terminal and when heated, changes its shape to envelop the flag-type terminal in close-fitting relationship.

6. A pre-stressed insulating cover for a flag-type electrical terminal, the cover being formed of heat-shrinkable tubular plastic material having a configuration comprising walls forming an open ended tubular portion having a laterally extending lip at one side and an axially extending projection at the other side, said lip and projection defining an open pocket with an inclined entrance opening the flag portion of the electrical terminal being insertable into said tubular portion of the cover through said entrance opening, said cover when heated changing its shape to envelop the electrical terminal in close-fitting relationship.

* * * * *